United States Patent Office 2,873,722
Patented Feb. 17, 1959

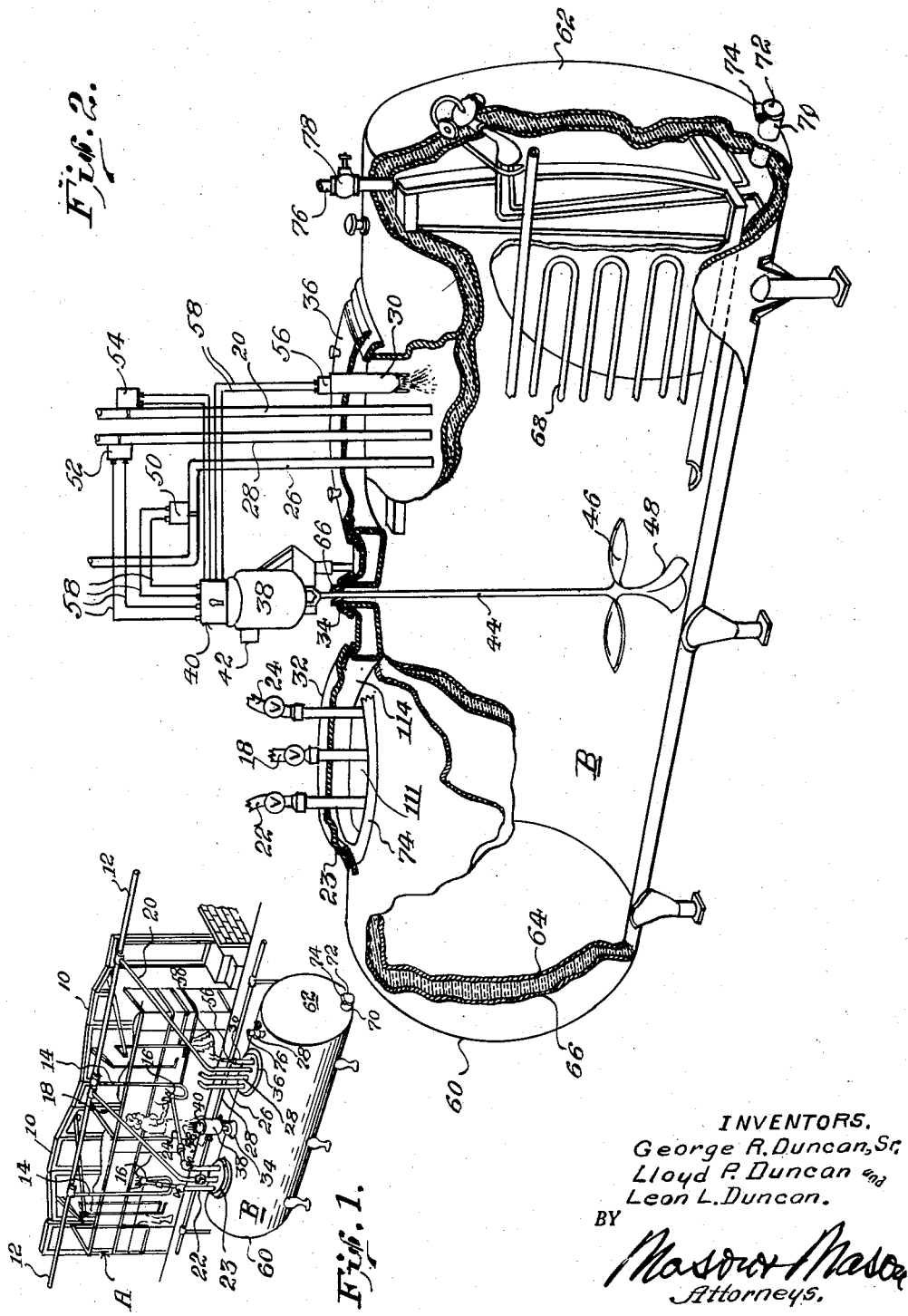

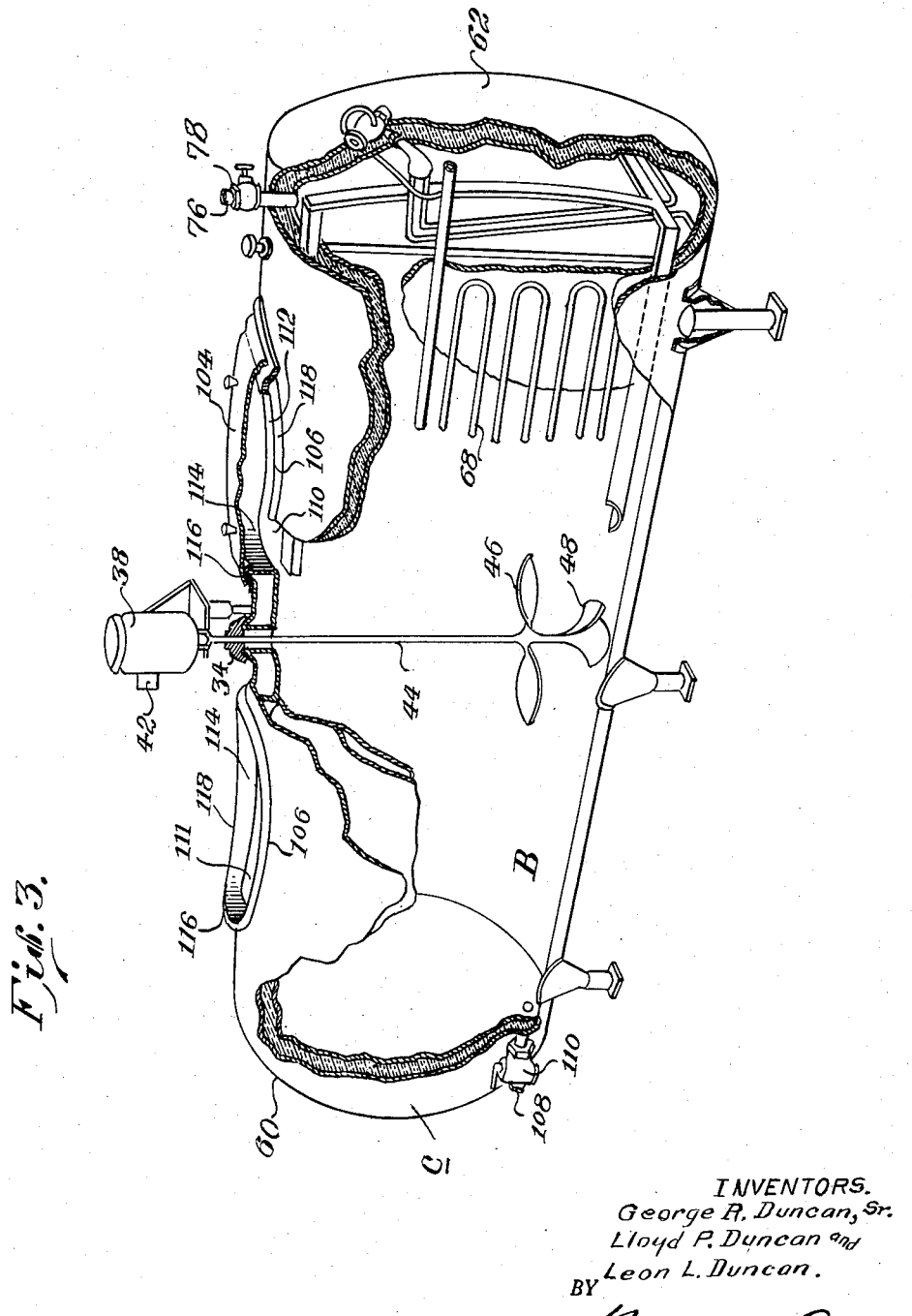

2,873,722

BULK MILK TANK AND WASHER THEREFOR

Leon L. Duncan, Lloyd P. Duncan, and George R. Duncan, Sr., Washington, Mo., assignors to Zero Manufacturing Company, Washington, Mo., a company of Missouri Application November 22, 1957, Serial No. 698,299

11 Claims. (Cl. 119—14.09)

This invention relates to a means and method for milking cows and for washing the interior of a milk vacuum tank provided with means for milking directly from the cows into the milk tank.

An object of the invention is to provide a milking system including a bulk milk tank having vacuum and milk lines extending into the tank, with means for washing the tank between milking operations, and for stirring the milk during milking of the cows.

Another object is to provide a specially constructed tank, with opening means having upwardly extending flange means of novel construction and lids for said openings.

A further object is a system of the type set forth above in which the tank has means for manual pouring of milk into the tank.

An additional object is a system of the type set forth above which includes a bulk milk tank that may be used for manual pouring of the milk, but which may be readily converted to the automatic filling of the tank with milk.

Other objects will appear hereinafter throughout the specification.

In the drawings:

Figure 1 is a perspective view of a portion of the milking parlor showing one form of the invention;

Figure 2 is a perspective view of the milk tank of Figure 1, partly broken away; and Figure 3 is a view similar to Figure 2 of a second form of the invention.

This application is an improvement on the structure disclosed in the application of Lloyd P. Duncan et al. Serial No. 655,224, filed April 26, 1957.

In the drawings Figure 1 shows at A a milking parlor and B shows a bulk milk tank located in said milking parlor. The milking parlor has a stall construction 10 for a plurality of animals, two stalls being illustrated.

Extending longitudinally of the milk parlor is a vacuum line 12 having branch lines 14 leading directly to the sets of teat cups 16.

There has also been illustrated a pair of additional vacuum branch lines 18 and 2 leading from main line 12 directly to the interior of the bulk milk tank B, but it will be understood that only one of these lines may be provided, two lines being provided in order to allow for quick assembly and disassembly of vacuum milk lines and wash lines etc. with the milk tank. As shown in Figure 1, the milk lines lead from the sets of teat cups to the interior of tank B.

Additionally there has been provided a cold water line 26, but water line 28, and soap dispenser 30.

As shown particularly in Figure 1, lines 22 and 24 lead from the sets of teat cups to the interior of tank B through cover 23, but it will be understood that these lines could extend instead directly through the cylindrical sides, or the ends of the tank B.

As shown more particularly, the tank is generally cylindrical in shape, although the shape of the tank forms no part of the present invention, except for the shape or design of the lid opening, its flanges, and the lid construction hereinafter to be described.

Cover 23 supports milk lines 22 and 24, and vacuum line 18. Cover 34, which is a sealed cover, supports electric motor 38 and the timer 40 mounted thereon. A rheostat or other type of switch 42 is mounted on the motor for turning on or turning off the motor and for regulating the speed thereof. There may also be provided a conventional hand operated switch, not shown, for starting and stopping motor 38. Preferably directly connected so as to be directly driven by the electric motor is a shaft 44 having a main stirrer 46 and a smaller stirrer 48. This latter stirrer is located below stirrer 46 so as to be adjacent to the bottom of the tank for agitating continuously the heavier portions of the milk during and after the milking operation, and later for stirring the heavier portions of the cleaning or washing solution during cleaning of the tank. The stirrers 46 and 48 at this time mix heavier portions of the cleansing solution, including undissolved soap particles, with the lighter portions thereof in a continuous operation.

Pipes or conduits 26, 28 and 20, and soap dispenser 30, are provided with solenoid operated valves 50, 52, 54 and 56, connected by suitable wiring 58.

The tank may have semi-spherical ends 60 and 62. The tank is of the dual wall type, the inner wall being shown at 64 and the outer wall at 66. A cooling coil for a refrigerant 68 lies in contact with the inner wall 64 for a substantial part of the length of the tank. The pipe coil is connected to a source of refrigeration whereby liquid is cooled by said source and may be circulated through said coil, as set forth in the Duncan Reissue Patent No. 24,162. Any other means for cooling the inner wall may be substituted for that shown, such as the cooling constructions used in the George R. Duncan Patents Nos. 2,740,378; 2,763,240; 2,739,568.

The above description is generally similar to the disclosure of application Serial No. 655,224, noted above, although the lids and tank openings are of a different construction.

In the operation of the construction shown in Figure 3, the milk may be poured into the tank, in which case a cover similar to cover 104 will be used. On the other hand, if it is desired to connect the tank so as to form a part of a milking system, a cover similar to cover 32, with pipes 22, 18 and 24, will be used.

The right hand cover will be removed in Figure 3 for the purpose of pouring in washing solutions and soap either in powdered or liquid form.

As shown in Figure 3, the tank openings 111 and 112 are alike. Each is provided with an upstanding flange 114. As shown at the left in Figure 2, the flange 114 has rounded or semi-circular ends 116 and sides 118 which join the ends, as viewed from above the tank. These sides may be slightly curved where they join the ends.

The sides gradually become lower at their central portions so as to present a dip 106 at their central portions. This construction enables an observer to see along the top undersides of the tank in order to determine whether the tank, after cleaning, has been thoroughly cleaned. Both lids 104 (only one being shown) are correspondingly shaped so as to fit tightly against the flanges 114. A rubber or other flexible washer (not shown) may be inserted between each lid and its flange.

In Figure 3, the tank C is constructed in all respects like tank B. However, preferably no pipes for washing and for soap powder are shown, these operations being carried on by manually depositing the liquid and powder through opening 112. Opening 111 may have the milk and vacuum lines corresponding to lines 22, 18 and 24 extending through a lid in the same manner as lid 23 of Figure 2. However, these lines may be omitted and the milk may be poured through opening 111, or 112, in which case lid 104 for opening 112 will be duplicated for opening 111.

The flanges 118 are duplicates in their contours of configuration of the flanges shown in Figure 2, and the covers for each opening 111 and 112 are duplicates of each other, although it may be deemed expedient to provide pipes similar to pipes 18, 27 and 24 in the cover for either opening, or they may extend through the sides on either end of the tank.

The above description and drawings disclose two embodiments of the invention, and specific language has been employed in describing the several figures. It will, nevertheless, be understood that no limitations of the scope of the invention is thereby contemplated, and that various alterations and modifications may be made such as would occur to one skilled in the art to which the invention pertains.

We claim:

1. A milking system comprising milk withdrawing means, a cylindrical, horizontal-axis, milk cooling tank, conduit means interconnecting said milk withdrawing means and said tank, said tank having a conduit line inspection opening in a top portion thereof, said opening having an upwardly extending peripheral flange, the upper portion of said flange lying in a curved surface which is substantially coaxial with that of said tank, whereby an observer from outside said tank can see substantially the entire interior of said tank.

2. A milking system according to 1 having a second conduit means extending into said tank and vacuum producing means wherein said vacuum producing means is connected to said tank through said second conduit means.

3. A milking system according to 1 having a stirrer means, said stirrer means being introduced into said tank.

4. A milking system according to 1 wherein a soap dispenser to dispense soap into said tank is connected to said tank.

5. A milking system according to 1 wherein said tank has inner and outer walls and cooling means, said cooling means being disposed between said inner and outer walls.

6. A milking system according to 1 wherein said inspection opening has a greater length than width.

7. A milking system according to 1 wherein said milk withdrawing means comprises a set of teat cups.

8. A milking system for milking farm animals comprising a set of teat cups, a substantially cylindrical bulk milk cooling tank having a substantially horizontal longitudinal axis, a milk conduit interconnecting said teat cups with said cooler tank, said cooling tank having at least one inspection opening in substantially the top portion thereof, said opening being substantially of elliptical shape and having an upwardly extending peripheral flange, the upper portion of said flange lying in a curved surface which has substantially the same axis as the longitudinal axis of said cooler tank, whereby an observer from outside said tank can see substantially the entire interior of said tank.

9. A milking system for milking a farm animal comprising a milk withdrawing means, a horizontally disposed cylindrical bulk milk cooler tank, a milk conduit means interconnecting said cooler tank and said milk withdrawing means, a vacuum conduit operatively connected to said cooler tank, stirrer means in said cooler tank, variable speed power means operatively connected to said stirrer means, said stirrer means comprising at least one substantially vertically disposed shaft and propeller-type paddles on said shaft, an inspection opening in the upper portion of said cooling tank, said opening having an upwardly extending peripheral flange, the upper portion of said flange lying in a curved surface having an axis which substantially coincides with the longitudinal axis of said cooling tank, whereby an observer from outside said tank can see substantially the entire interior of said tank.

10. A milking system according to 9 having a lid adapted to fit snugly over said inspection opening.

11. A system for milking a farm animal, for cooling and storing the milk in a bulk receptacle as it comes from the animal, and for cleaning and inspecting the inside of the bulk receptacle, comprising milking means and milk conduit means extending therefrom, a milk cooler having insulating walls, a bulk milk vacuum receptacle on said cooler, said bulk milk cooler being generally cylindrical in shape with its longitudinal axis substantially horizontal and having an opening extending through its wall, said milk conduit means extending into the interior of said bulk milk receptacle, means for cooling said receptacle during the milking operation, a vacuum conduit means, said vacuum conduit means extending into said receptacle whereby to maintain the pressure inside said bulk milk receptacle lower than atmospheric pressure during the milking operation, stirrer means in said bulk milk receptacle, variable speed power means operatively connected to said stirrer means, said stirrer means comprising at least one substantially vertically disposed shaft and paddles on said shaft, the lowest of said paddles being a propeller-type paddle and located adjacent to the bottom of said bulk milk receptacle, said stirrer means functioning as cleaning means when revolved at high speed with cleaning fluid in the bottom of said bulk milk receptacle, an inspection opening in the top portion of said bulk milk cooler extending into said bulk milk receptacle, said opening having an upwardly extending peripheral flange, the upper portion of said flange lying in a curved surface having an axis which substantially coincides with the longitudinal axis of said bulk milk cooler, whereby an observer from outside said tank can see substantially the entire interior of said tank.

References Cited in the file of this patent

UNITED STATES PATENTS

| | | |
|---|---|---|
| 1,028,289 | Schravesande | June 4, 1912 |
| 1,987,917 | Thwaits | Jan. 15, 1935 |
| 2,024,639 | Greene | Dec. 17, 1935 |
| 2,739,568 | Duncan | Mar. 27, 1956 |